United States Patent [19]

Jacobson

[11] 4,309,805

[45] Jan. 12, 1982

[54] CARPET TACK-STRIP INSTALLING METHOD

[75] Inventor: Gerald D. Jacobson, Everett, Wash.

[73] Assignee: J & L Machinery, Inc., Everett, Wash.

[21] Appl. No.: 157,280

[22] Filed: Jun. 6, 1980

Related U.S. Application Data

[62] Division of Ser. No. 931,198, Aug. 4, 1978, Pat. No. 4,225,074.

[51] Int. Cl.³ .............................................. B23P 19/00

[52] U.S. Cl. ........................................ 29/429; 29/432; 16/16; 206/53

[58] Field of Search ...................... 29/429, 432, 432.1; 227/111, 2, 136; 206/53; 16/16; 52/741, 745

[56] References Cited

U.S. PATENT DOCUMENTS

| | | | |
|---|---|---|---|
| 2,529,463 | 11/1950 | Van Belle | 16/16 |
| 3,086,209 | 4/1963 | Kamborian | 29/429 |
| 3,310,215 | 3/1967 | Bostick | 227/111 |
| 3,559,273 | 2/1971 | Parzio | 16/16 X |
| 3,837,069 | 9/1974 | Nardgren | 29/432.1 |
| 3,895,708 | 7/1975 | Jureit | 206/53 |
| 3,992,768 | 11/1976 | De Nicola et al. | 29/429 |
| 4,021,909 | 5/1977 | Ballmer | 29/432.1 |
| 4,033,025 | 7/1977 | Jureit et al. | 29/432 X |

*Primary Examiner*—Charlie T. Moon

[57] ABSTRACT

A roll of tack-strip is supported on a cradle of rollers carried by a wheeled frame. The tack-strip having its tack-point side down, extends over a bristle guide roller and through a nip formed by and between a pair of bristle rollers to a nailing station located at a lower rear corner portion of the machine. As the frame is pushed by an operator around the perimeter of a room the tack-strip is unwound from the roll, guided into a position on the floor next to a wall or the like, and nailed into place. A cutter located between the roll and a nailer is operable by the push of a button to cut the tack-strip at the end of a run. The machine is operable to feed out a measured length of tack-strip while the machine is not moving, so that the operator can cut off short lengths of tack-strip. The nailer is removably mounted within the machine so that the operator can lift it out of the machine and use it for installing the short lengths at locations where the machine cannot be used for installing the tack-strip.

4 Claims, 5 Drawing Figures

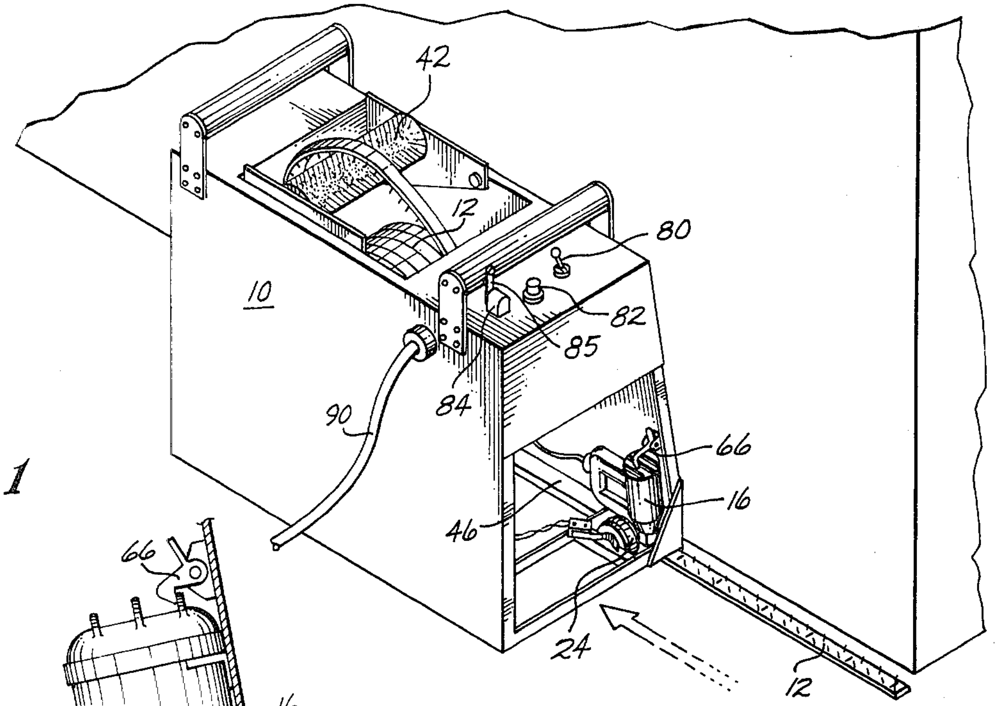
Fig. 1
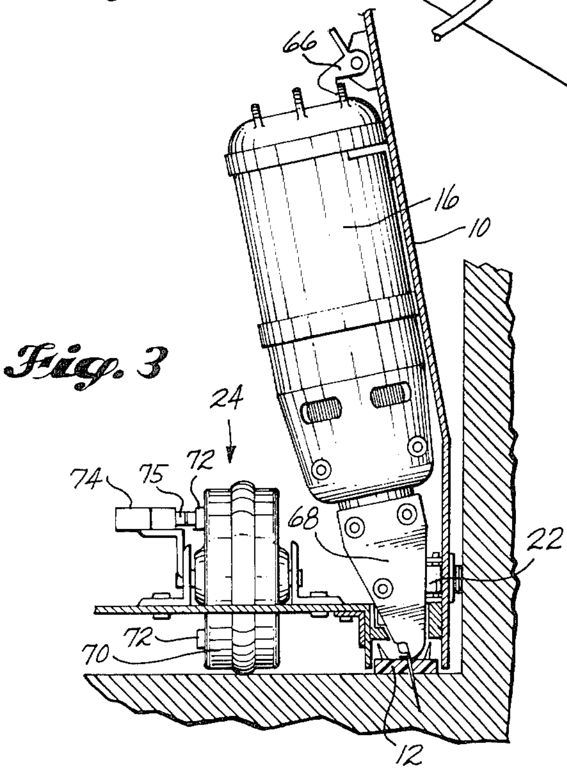
Fig. 3
Fig. 2
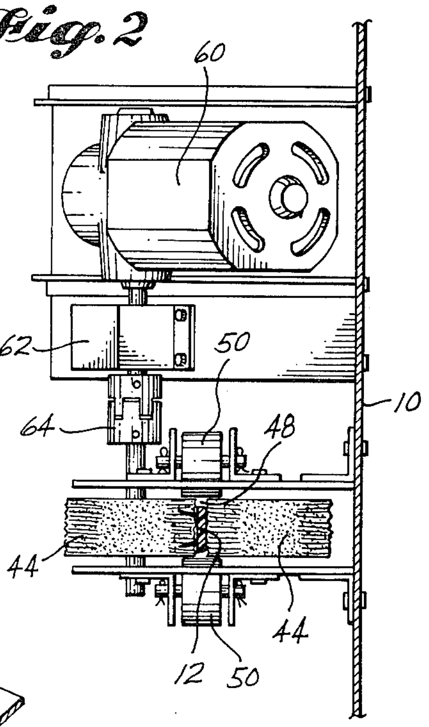
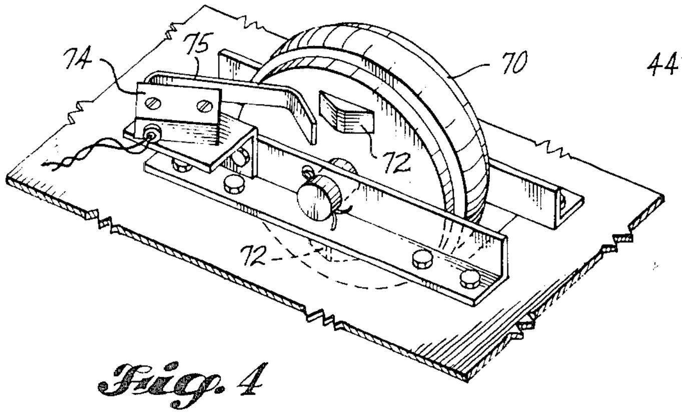
Fig. 4

CARPET TACK-STRIP INSTALLING METHOD

This is a division of application Ser. No. 931,198, filed Aug. 4, 1978, now U.S. Pat. No. 4,225,074, issued Sept. 30, 1980.

BACKGROUND OF THE INVENTION

1. Field of the Invention

This invention relates to the provision of carpet tack-strip in roll form and to a method for installing such carpet tack-strip.

2. Description of the Prior Art

The practice of using "tack-strip" for attaching carpets to floors is quite old. Conventional tack-strip comes in short lengths which in appearance resembles wooden yardsticks having tack points projecting from one side thereof. The tack-strips are nailed to the floor with the points directed upwardly, usually by a kneeling workman using a hammer, staple gun or the like. The carpet is stretched and its edge portion is pushed down onto the stack points which penetrate the carpet backing and serve to hold the carpet in place.

Machines for installing strips of various types of material (but not tack-strip) which can be found in the patent literature are shown by U.S. Pat. No. 3,771,708 granted Nov. 13, 1973, to Frank DeNicola and G. Edward Vallender, and by U.S. Pat. No. 3,310,215, granted Mar. 21, 1867, to Louis D. Bostick. U.S. Pat. No. 3,895,708 granted July 22, 1975, to John C. Jureit and Ben Kushner, discloses a connector plate stock in strip form wound onto a spool, but does not disclose a machine for installing the connector plate stock.

SUMMARY OF THE INVENTION

According to one aspect of the present invention, a method of installing carpet tack-strip on a floor adjacent a wall involves first providing bulk carpet tack-strip in the form of a roll. The roll of tack-strip is moved along a floor adjacent a wall and the tack-strip is unwound from the roll. The tack-strip is fed on the floor into a position adjacent a wall or the like with its tack points directed upwardly. The tack-strip is nailed to the floor at intervals along the tack-strip as the roll of tack-strip is being moved along the floor.

A machine for installing carpet tack-strip onto a floor adjacent a wall comprises a mobile frame carrying tack-strip handling means and adapted to be moved along the floor adjacent the wall. The tack-strip handling means generally comprises a means for supporting a roll of tack-strip having a plurality of tack points projecting from one side thereof. A means for feeding the tack-strip from such a roll is included and is adapted to position the tack-strip on the floor adjacent the wall with the tack-points directed upwardly. A nailing means is adapted to nail the tack-strip to the floor at intervals along the length of the tack-strip as the machine is being moved.

The foregoing and other objects, features and advantages of the present invention will become more apparent in the light of the foregoing detailed description of preferred embodiments thereof as is illustrated in the accompanying drawings.

DESCRIPTION OF THE DRAWINGS

FIG. 1 is a perspective view of one embodiment of a typical carpet tack-strip machine for use in performing the method of the present invention;

FIG. 2 is an enlarged top view of a portion of the carpet tack-strip machine; showing a bristle roller pair and the bristle roller drive motor;

FIG. 3 is an enlarged front elevation view of the carpet tack-strip machine, showing the nailing means and the nailer automatic actuation means;

FIG. 4 is an enlarged perspective view of a typical nailer automatic actuation means.

DESCRIPTION OF THE PREFERRED EMBODIMENT

Figure 5:
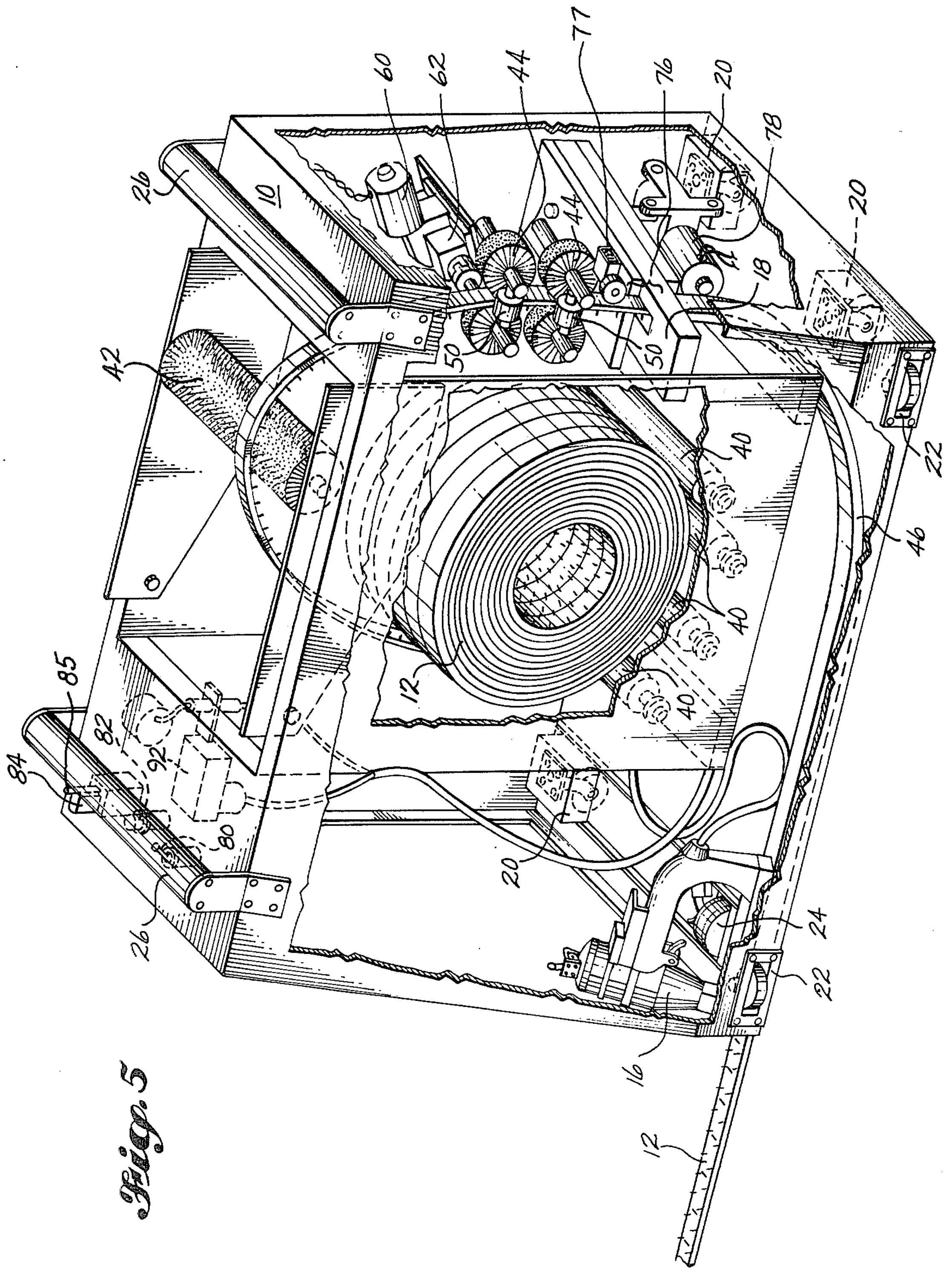
FIG. 5 is an enlarged perspective view of the carpet tack-strip machine, with portions of the machine cut-away.

As shown in FIGS. 1 and 5, the carpet tack-strip machine essentially comprises a mobile frame 10, a roll 12 of tack-strip, and tack-strip handling means carried by the frame 10 which include a means 40 for supporting a roll of tack-strip, a means for feeding the tack-strip from the roll to a position on the floor (shown generally at 42 and 44), and a nailing means 16 adapted to nail such tack-strip. Additionally, within the frame 10 are a plurality of floor engaging guides 20, a plurality of wall engaging guides 22, and an automatic actuation means adapted to automatically operate the nailing means 16 upon movement of the frame 10. Rigidly secured to the upper surface of the frame 10 are a plurality of handles 26, and a plurality of manually activated control switches (shown at 80, 82, and 84) adapted to provide control of the tack-strip handling means.

Tack-strip is generally old per se, but heretofore took the form of short, straight lengths of a rigid material such as plywood or the like containing a plurality of tacks projecting from the upper surface of of the tack-strip and along its length. As shown in FIG. 5, the present invention does not use short, straight conventional tack-strip, but rather is adapted to use a roll 12 of tack-strip which has a plurality of tack-points projecting from one side thereof and along the length of such a strip. The roll 12 is wound such that the tack points are directed radially inwardly. Typical tack-strip can be constructed from any suitable material adapted to be rolled into a roll such as plastic, aluminum tape, paper or the like. In the preferred embodiment, typical tack-strip material consists of a one-quarter inch thick by seventh-eights inch ($\frac{1}{4}'' \times \frac{7}{8}''$) wide plastic strip rolled into a continuous roll of approximately one hundred feet. It is to be understood however that other tack-strip material in other thicknesses and widths may be used without departing from the spirit and scope of the present invention. Depending upon the tack-strip material used, a layer of impervious and impenetrable tape may be applied to the bottom surface of the tack-strip to prevent adjacent tack points from penetrating the tack-strip material when the material is wound into a roll.

As shown in FIG. 5, the roll of tack-strip 12 may be wound without the use of a support hub and flange. To support the roll within the frame, a plurality of rollers 40 extend across the width of the frame 10 and are formed into a cradle spaced partially around the circumference of the roll 12 at its bottom. The roll 12 is wound in a level wound manner (similar to that of fishing line wound on a fishing reel, or the way the connector strip is wound in U.S. Pat. No. 3,895,708) and has a width substantially the same as that of the frame 10. In this manner, when the roll 12 is unwound and fed into the tack-strip handling means as will be discussed below, lateral movement with the frame is prevented by the sides of the frame.

The means for feeding the tack-strip from the roll 12 into a position on the floor adjacent the wall generally comprises a bristle roller 42 in contact with the tack-point side of the tack-strip as the tack-strip is unwound from the roll 12. The bristle roller 42 has a plurality of bristles radially extending therefrom such that when the tack-point side of the tack-strip engages the roller 42, the tack-points enter into the roller between the bristles and are not thereby dulled by their contact with the roller. Bristle roller 42 is disposed within the frame 10 above the position for the roll 12 defined by the cradle formed by the plurality of rollers 40 such that as the tack-strip is unwound from the roll 12 and around the bristle roller 42, the tack-strip is unwound forwardly in a loop and in the direction of travel of the frame 10.

A plurality of bristle roller pairs 44 are disposed in the front portion of the frame 10 adjacent the position for the roll 12 defined by the cradle formed by the plurality of rollers 40. Each roller in a bristle roller pair 44 is in a spaced apart relation with respect to the other roller in that pair thereby forming a nip 48 therebetween through which the tack-strip travels. A plurality of rotary side guide rollers 50 are disposed on opposite sides of the nip 48 and prevent the tack-strip from lateral movement out of the nip 48 as the roll 12 is unwound. It can be seen that other embodiments for feeding the tack-strip from the roll 12 to a position on the floor adjacent a wall may be made without departing from the teachings of the present invention. By way of a non-limiting example, the bristle roller 42 may be one of a pair of rollers in a spaced apart relationship and forming a nip therebetween through which the tack-strip travels. In such an embodiment the bristle roller pairs are disposed within the frame 10 in such a manner as to unwind the roll 12 forwardly in a loop and in the direction of travel of the frame 10.

As shown in FIG. 2, one bristle roller of the bristle roller pair 44 is adapted for power rotation by an electric motor 60 and universal joint 64. Disposed between the electric motor 60 and the universal joint 64 is a manually controllable clutch means 62 adapted to disengage the electric motor 60 from the bristle roller 44, thereby allowing the bristle roller 44 to rotate freely. The clutch means 62 is controllable by the machine operator through the plurality of manually actuated control switches disposed on the top of the frame 10.

A guide channel 46 is disposed beneath the roll 12 and is adapted to position the tack-strip adjacent the lower edge of a wall as the tack-strip passes through the nip 48. The guide channel 46 is of a width substantially equal to that of the tack-strip and is of a height substantially equal to that of the height of the tack-strip and the plurality of tack-points extending therefrom. The guide channel can be formed from any suitable rigid material such as aluminum or the like.

A nailing means 16, typically a power hammer, a stapler or the like, is disposed within the frame 10 adjacent where the tack-strip leaves the frame. As shown in the embodiment of FIG. 5, the nailing means 16 is located at the end of the guide channel 46 and adjacent the lower edge of a wall at an acute angle with respect ot the wall. The nailing means 16 is detachably secured to the frame 10 by a mount 66 permitting the nailing means to be removed from within the frame and manually operated apart from the frame. The head portion 68 of the nailing means 16 is disposed slightly above the tack-strip 12 and in such a manner as to permit the plurality of tack points extending from the upper surface of the tack-strip to freely pass by the head portion 68 of the nailing means 16. Nailing means 16 is adapted to secure the tack-strip 12 to a surface at predetermined and repetitive intervals along the length of the tack-strip.

With reference to FIGS. 3–5, a nailer automatic actuation means 24 comprises a floor engaging wheel 70, having a cam surface means 72 disposed circumferentially around one side thereof, and a power control means for the nailing means 16 generally comprising a switch means 74 having a trip arm 75 attached thereto. As the floor engaging wheel 70 rotates in the direction of travel of the frame 10, the cam surface 72 on wheel 70 periodically contacts and moves the trip arm 75 thereby closing the switch means 74 actuating the power control means and in turn causing the nailing means 16 to engage the tack-strip 12 and drive a staple or the like therein. In the preferred embodiment, the diameter of the floor engaging wheel 70 together with the cam surface means 72 provides a nailer automatic actuation means adapted to secure the tack-strip 12 to the surface at approximately every six inches along the length of the tack-strip.

A cutter means 76 is disposed within the means for feeding the tack-strip between the bristle roller pairs 44 and the guide channel 46 and comprises a compound-beveled cutting blade adapted to cut the tack strip from the edge thereby sliding past the tacks, and a cutter motor 78. The cutter motor 78 is activated by one of the plurality of the manually actuated control switches disposed on top of the frame 10. The cutter means 76 also includes a meter means 77 adapted to measure the length of tack-strip which has been unwound from the roll 12. In this manner, as the frame 10 approaches a corner between adjacent connecting wall sections, the carpet tack machine operator may sever a length of the tack-strip from the roll 12 such that the severed length of tack-strip will abut the corner of the wall sections.

A plurality of floor engaging wheels 20 typically castors, wheels or the like are disposed at the bottom of the frame 10 and are adapted to moveably support the frame on the surface to be carpeted. A plurality of wall engaging guides 22 are disposed upon the outside of the frame 10 and engage the wall slightly above the lower edge of the wall and the tack-strip 12. The plurality of wall engaging guides 22 are adapted to allow the frame 10 to follow the contour of a wall and lay a section of tack-strip on the surface at a predetermined distance from the wall.

A plurality of handles 26 extending across the width of the frame 10 are rigidly secured to the upper surface of the frame and at opposite ends thereof. The handles 26 provide a means by which an operator may conveniently position, maneuver and operate the carpet tack-strip installing machine. A plurality of manually actuated control switches are disposed upon the top surface of frame 10 adjacent the rear handle 26. In the preferred embodiment, the plurality of manually actuated control switches includes an on/off power switch 80, a cutter means actuation switch 82, and a speed switch 84 adapted to control the speed at which the electric motor 60 rotates. The speed switch 84, typically of the type used in the variable speed electric drills, has a reversing lever 85 adapted to cause the electric motor 60 to rotate in either the clockwise or counterclockwise direction. It is to be understood that additional manually activated control switches may be included without departing from the spirit and scope of the present invention.

OPERATION OF A CARPET TACK STRIP MACHINE

The typical operation of a carpet tack-strip installing machine according to the present invention will next be described. A roll of bulk tack-strip 12 is positioned within the frame 10 and upon the cradle form by the plurality of rollers 40. The loose end of the roll 12 is looped over the bristle roller 42 such that the tack points engage the bristle roller. The loose end of the tack-strip 12 is then threaded through the nip 48 formed by the plurality of the bristle roller pairs 44, through the guide channel 46 to the rear of the frame 10. The frame 10 is then positioned against the wall such that the plurality of wall engaging guides 22 engage the wall slightly above the lower edge of the wall (see FIG. 1). The power cord 90 is attached to any convenient wall outlet, and in conjunction with a junction box 92 (see FIG. 5) provides power to the electric motor 60, the cutter motor 78, and the nailing means 16. When the electric motor 60 is activated through the on/off switch 80 and speed switch 84, the plurality of bristle rollers 44 begin to rotate thereby advancing the tack-strip 12 through the nip 48 and the guide channel 46. When the frame 10 begins forward movement, the nailer automatic actuation means in conjunction with the cam surface means 72 and the switch 74 automatically actuate the nailing means 16 thereby securing the tack-strip 12 to the surface at predetermined and repetitive intervals along the length of the tack-strip. If the tack-strip 12 is of a sufficient rigidity, such as provided by plastic, metal or the like, the frame 10 will self propel as the roll 12 unwinds. In a typical situation however, a gentle forward pushing by the machine operator will usually be necessary.

As the frame 10 approaches a corner between adjoining walls, the operator may sever a portion of the tack-strip from the roll 12 as by manual actuation of the cutter switch 82. The power to the electric motor 60 may be removed thereby preventing further unwinding of the roll 12, and the frame 10 may be repositioned adjacent a second wall. By detaching the nailing means 16 from frame 10 through mount 66, the operator may then manually operate the nailing means 16 and secure the remaining length of tack-strip to the surface.

It will be obvious to those skilled in the art to which this invention is addressed, that the invention may be used to advantage in any situation where it is necessary to rapidly and efficiently install carpet tack strip. Therefore, it is also to be understood by those skilled in the art that various changes, modifications, and omissions in form and detail may be made without departing from the spirit and scope of the present invention as defined by the following claims.

What is claimed is:

1. A method for installing carpet tack-strip on a floor adjacent a wall comprising the steps of:

(a) providing bulk tack-strip in the form of a roll;

(b) moving said roll of tack-strip along a floor adjacent a wall;

(c) unwinding said tack-strip from said roll of tack-strip;

(d) feeding said tack-strip into a position on said floor adjacent said wall with the tack points directed upwardly; and, (e) nailing said tack-strip to said floor at intervals along the length of said tack-strip as said roll of tack-strip is being moved.

2. The method in claim 1, comprises positioning said roll of tack-strip on a frame and manually pushing said frame along said floor.

3. The method in claim 1, comprising feeding said tack-strip through a nip formed by a plurality of rotary rollers being in a spaced apart relation with respect to each other, with one of said rollers being adapted for power rotation such that as roller rotates, said tack-strip is unwound from said roll and moves said machine along said floor.

4. The method of claim 1, comprising guiding said tack-strip as it is unwound from said roll by means of a bristle guide roller in contact with the tack-point side of the tack-strip.

* * * * *